United States Patent
Kilgariff et al.

(10) Patent No.: US 7,486,290 B1
(45) Date of Patent: Feb. 3, 2009

(54) GRAPHICAL SHADER BY USING DELAY

(75) Inventors: Emmett M. Kilgariff, San Jose, CA (US); Rui M. Bastos, Porto Alegre (BR); Wei-Chao Chen, San Jose, CA (US); Douglas J. Hahn, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 113 days.

(21) Appl. No.: 11/149,717

(22) Filed: Jun. 10, 2005

(51) Int. Cl.
*G06F 15/00* (2006.01)

(52) U.S. Cl. .................... 345/426; 345/419; 345/584; 717/143; 717/170

(58) Field of Classification Search ............ 345/426, 345/427, 419, 584; 717/143, 145, 170, 173
See application file for complete search history.

(56) References Cited

U.S. PATENT DOCUMENTS

| | | | |
|---|---|---|---|
| 6,016,474 A | 1/2000 | Kim et al. | |
| 6,141,740 A | 10/2000 | Mahalingaiah et al. | |
| 6,314,493 B1 | 11/2001 | Luick | |
| 6,438,664 B1 | 8/2002 | McGrath et al. | |
| 6,839,062 B2 * | 1/2005 | Aronson et al. | 345/522 |
| 6,891,543 B2 * | 5/2005 | Wyatt | 345/541 |
| 7,015,909 B1 * | 3/2006 | Morgan, III et al. | 345/426 |

OTHER PUBLICATIONS

Parhami, Computer Arithmetic, Oxford University Press, Jun. 2000, pp. 413-418.*
gDEBugger, graphicRemedy, http://www.gremedy.com, Aug. 8, 2006.
Duca et al., A Relational Debugging Engine for Graphics Pipeline, International Conference on Computer Graphics and Interactive Techniques, ACM SIGGRAPH 2005, pp 453-463, ISSN:0730-0301.

* cited by examiner

*Primary Examiner*—Phu K Nguyen (57) ABSTRACT

A graphical shader and a method of distributing graphical data to shader pipelines in a graphical shader are disclosed. In accordance with the method, a shader pipeline input delay is set. Further, a group of the graphical data is distributed to a shader pipeline of the graphical shader to be processed. The method includes waiting for the shader pipeline input delay to elapse. After the shader pipeline input delay has elapsed, another group of the graphical data is distributed to another shader pipeline of the graphical shader to be processed. In another embodiment, a graphical shader includes a plurality of shader pipelines for processing graphical data. Further, the graphical shader includes a shader distributor for distributing a group of the graphical data to one of the shader pipelines and for distributing another group of the graphical data to another one of the shader pipelines after a shader pipeline input delay has elapsed.

26 Claims, 6 Drawing Sheets

GRAPHICAL SHADER BY USING DELAY

BACKGROUND OF THE INVENTION

1. Field of the Invention

Embodiments of the present invention generally relate to graphics processing. More particularly, embodiments of the present invention relate to improving graphical shader by using delay.

2. Related Art

A graphics processing unit (GPU) is a semiconductor device that specializes in rapidly processing graphical data compared to a typical central processing unit (CPU). The GPU is also utilized for general purpose processing tasks typically performed by the CPU. Within the GPU, there is a graphical shader that performs numerous operations on graphical data to obtain desired optical features and that interfaces with a texture unit. The texture unit further modifies the graphical data to have desired texture and optical features. In some implementations, the texture unit is implemented as part of the graphical shader. Generally, the fabricated GPU utilizes most of the semiconductor area available on the semiconductor chip die. In particular, the graphical shader uses a significant portion of the semiconductor area. Moreover, the processing speed of the GPU is measured by the amount of graphical data that is processed in any time period. Further, the amount of graphical data that can be processed by the graphical shader substantially affects the processing speed of the GPU. Hence, improvements in processing by the graphical shader lead to performance enhancements for the GPU.

Typically, the graphical shader processes or operates on groups of graphical data. The size of these groups depends on various factors. For example, the group may be a pixel quad (or quad), which is a 2×2 pixel block. However, the group may have other number of pixels. In general, the group may have from 1 to M pixels, where M is an integer.

Recently, improvements in graphical processing by the graphical shader have been achieved through the use of a graphical shader architecture that provides for multiple shader pipelines, enabling parallel processing of the graphical data. Each shader pipeline is programmable to perform graphical processing operations on graphical data. For example, multiple quads are distributed to a shader pipeline for processing. The number of quads distributed to the shader pipeline is called a "segment". The segment may loop through the shader pipeline several times before the shader pipeline completes processing the segment. Each loop through the shader pipeline is called a "shader pass" and executes one or more instructions of a shader program. Further, the shader pipelines have access to texture and/or memory data which are often cached for improved performance.

Conventionally, a segment is distributed to one of the shader pipelines after the segment is available. If the graphical shader has four operable shader pipelines and four segments are available, each segment will be distributed to a respective shader pipeline, usually but not restricted to a sequential distribution manner. That is, the four shader pipelines operate concurrently and may require concurrent use of the graphical shader's and GPU's resources. This causes several problems. Some of these problems are shown in FIG. 1.

Figure 1:
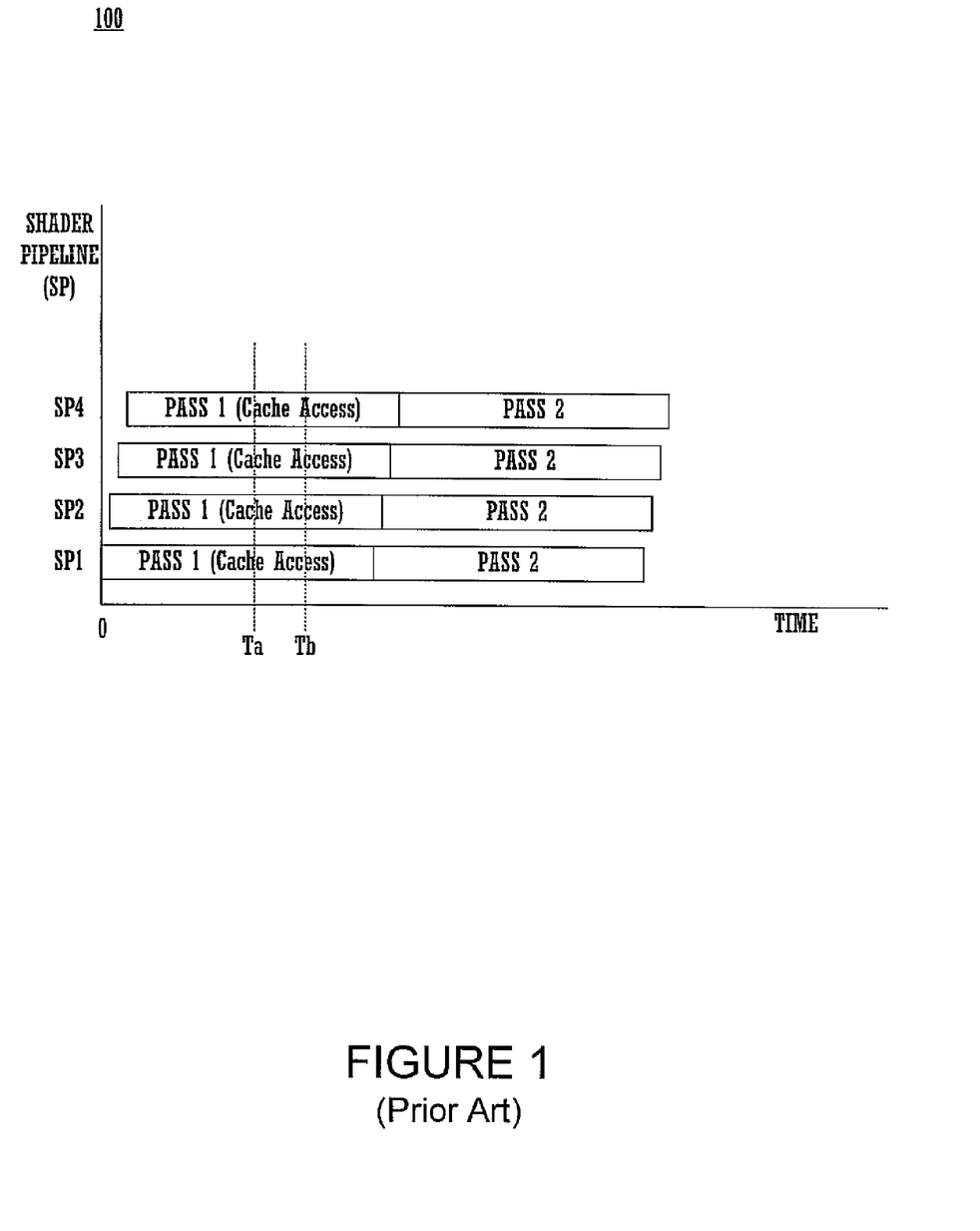
FIG. 1 illustrates a timing scheme for a conventional graphical shader having multiple shader pipelines.

FIG. 1 illustrates a timing scheme 100 for a conventional graphical shader having multiple shader pipelines. As shown in FIG. 1, four shader pipelines (e.g., SP1, SP2, SP3, and SP4) have received a respective segment sequentially. Each shader pipeline performs a first shader pass (Pass 1) and a second shader pass (Pass 2). During the first shader pass (Pass 1), each shader pipeline (e.g., SP1, SP2, SP3, and SP4) typically accesses the cache of the graphical shader. For example, the cache access may be needed to obtain a particular texture for the respective segment being processed.

Between time T=Ta and T=Tb, the four shader pipelines (e.g., SP1, SP2, SP3, and SP4) are performing the first shader pass (Pass 1) on their respective segment. That is, up to four shader pipelines (e.g., SP1, SP2, SP3, and SP4) may simultaneously request access to the cache of the graphical shader. This situation creates bursts in cache accesses that overwhelm the cache bandwidth. Moreover, this situation creates cache memory coherency problems because, at the same time, data requests from different shader pipelines often have poor correlation because their graphical pixels are often temporally and spatially disjoint from each other. As described above, the graphical shader uses a significant portion of the semiconductor area. An increase in the size or number of caches may be expensive and impractical. Cache memory coherency problems arise when cache lines are overwritten by one shader pipeline due to the finite number of cache lines in the cache while the cache lines are still in use by another shader pipeline. The net effect of these problems is degradation in graphical processing performance. These problems are amplified as the number of shader pipelines is increased.

SUMMARY OF THE INVENTION

A graphical shader and a method of distributing graphical data to shader pipelines in a graphical shader are disclosed. In accordance with the method, a shader pipeline input delay is set. Further, a group of the graphical data is distributed to a shader pipeline of the graphical shader to be processed. The method includes waiting for the shader pipeline input delay to elapse. After the shader pipeline input delay has elapsed, another group of the graphical data is distributed to another shader pipeline of the graphical shader to be processed.

In another embodiment, a graphical shader includes a plurality of shader pipelines for processing graphical data. Further, the graphical shader includes a shader distributor for distributing a group of the graphical data to one of the shader pipelines and for distributing another group of the graphical data to another one of the shader pipelines after a shader pipeline input delay has elapsed.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

As described above, improvements in the graphical shader lead to performance enhancements for the GPU. The present invention will focus on delaying the distribution of graphical data (or segments) to the shader pipelines to cause a net increase in graphical processing performance through the graphical shader.

Figure 2:
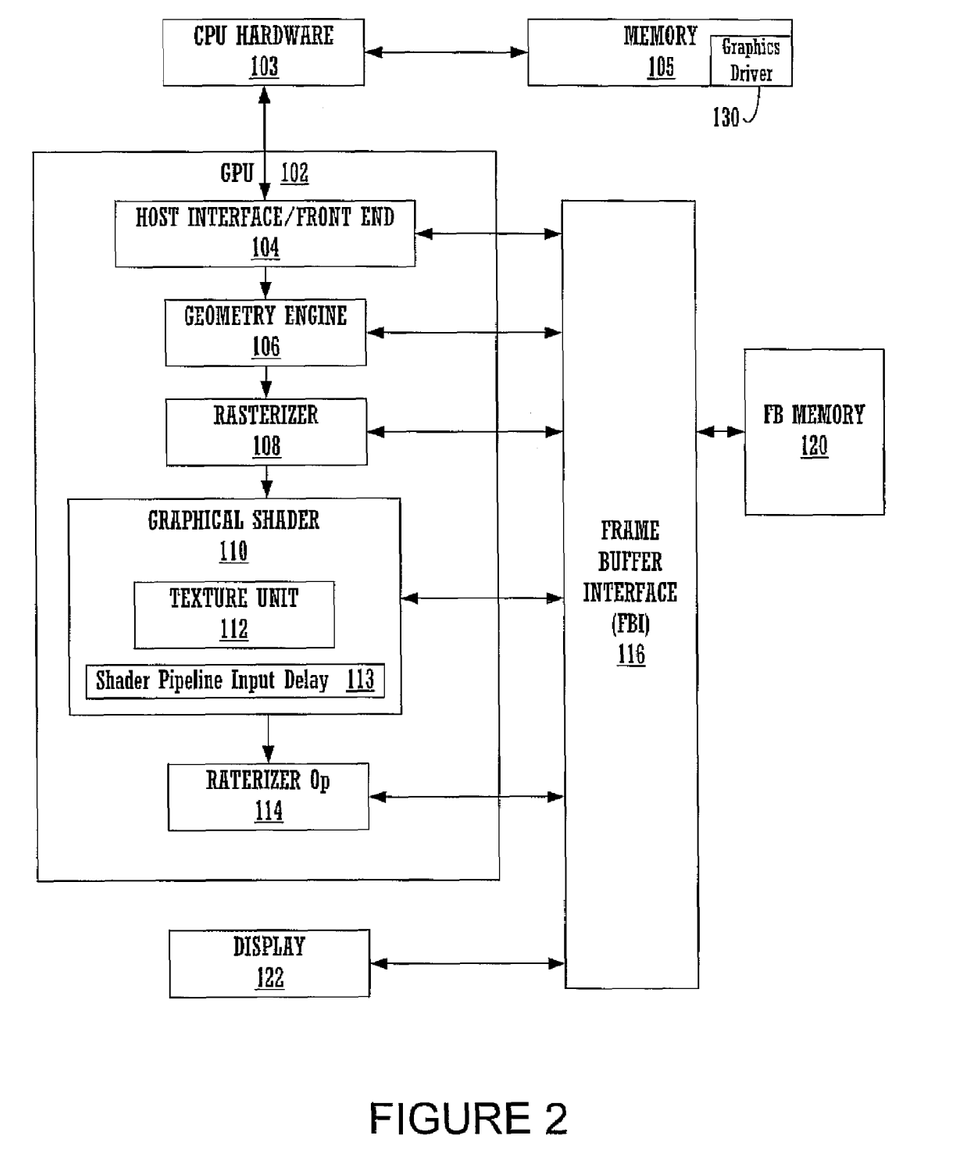
FIG. 2 illustrates a graphics processing unit (GPU) in accordance with an embodiment of the present invention, showing a graphics processing pipeline including a graphical shader.

FIG. 2 illustrates a graphics processing unit (GPU) 102 in accordance with an embodiment of the present invention, showing a graphics processing pipeline including a graphical shader 110. The GPU is a semiconductor device that specializes in rapidly processing graphical data compared to a typical central processing unit (CPU). The GPU may also be utilized for general purpose processing tasks typically performed by the CPU.

As depicted in FIG. 2, the GPU 102 has a graphics processing pipeline comprising a host interface/front end 104, a geometry engine 106, a rasterizer 108, a graphical shader 110, and a Raster Operations Processor 114. The host interface/front end 104 receives raw graphical data from central processing unit hardware 103 that is running an application program stored in memory 105. The host interface/front end 104 buffers input information and supplies that information to the geometry engine 106. The geometry engine 106 produces, scales, rotates, and projects three-dimensional vertices of graphics primitives in "model" coordinates into frame buffer coordinates. Typically, triangles are used as graphics primitives for three dimensional objects, but rectangles are often used as well.

The transformed coordinates of the vertices and their associated data produced by the geometry engine 106 are applied to the rasterizer 108. The rasterizer 108 determines the positions of all of the pixels within the graphics primitives. This is typically performed along raster (horizontal) lines that extend between the lines that define the graphics primitives. The rasterizer 108 also generates interpolated colors, depths and other texture coordinates for each pixel. The output of the rasterizer 108 is also referred to as rasterized pixel data.

Figure 3:
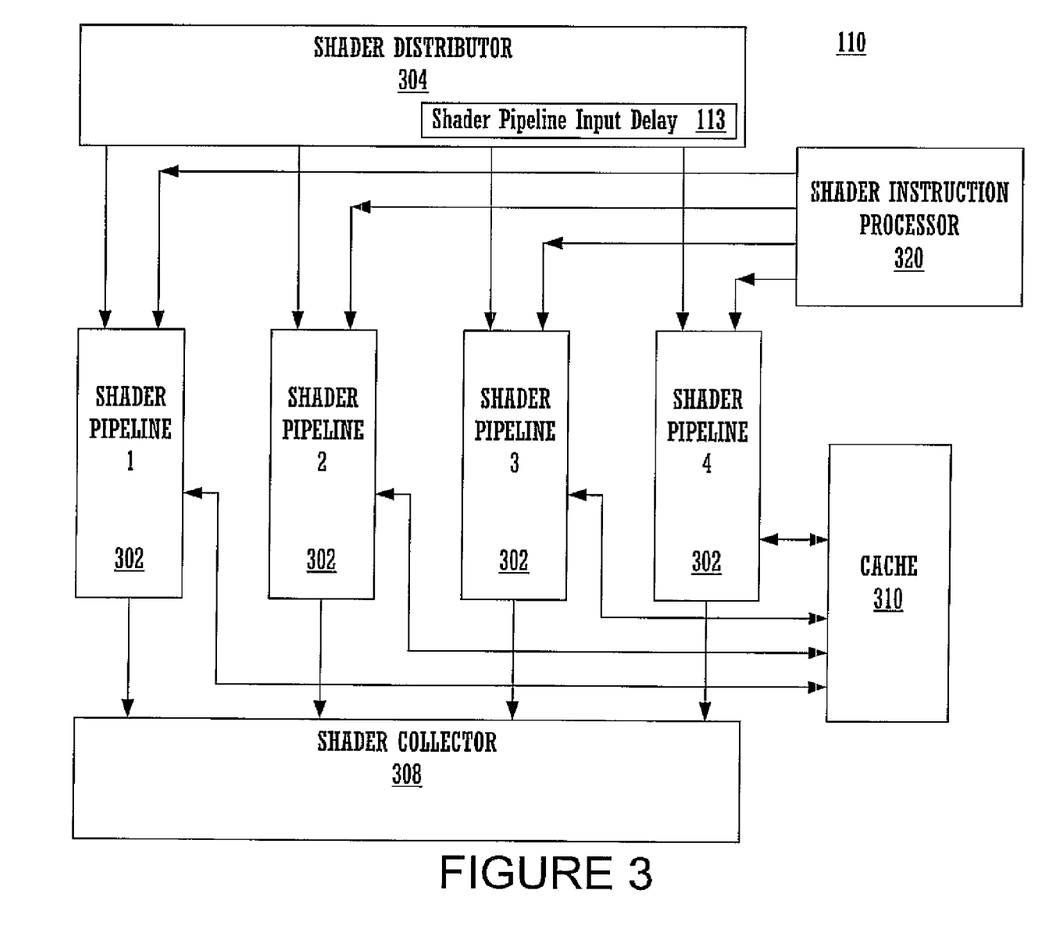
FIG. 3 illustrates the graphical shader of FIG. 2 in accordance with an embodiment of the present invention, showing multiple shader pipelines.

The rasterized pixel data is applied to the graphical shader 110 that adds texture and optical features related, for example, to fog and illumination to the rasterized pixel data to produce shaded pixel data. The graphical shader 110 is illustrated in FIG. 3. As shown in FIG. 3, the graphical shader 110 includes a multiple shader pipeline architecture. Also, the graphical shader 110 includes a texture unit 112 that modifies the rasterized pixel data to have the desired texture and optical features. The texture unit 112 may be implemented using a hardware pipeline that can access and process large amounts of data at very high speed.

Continuing, the graphical shader 110 includes a shader pipeline input delay 113. The shader pipeline input delay 113 is programmable. In an embodiment, the executed graphics driver 130 sets the shader pipeline input delay 113. Instead of immediately distributing multiple available segments to the shader pipelines of the graphical shader 110 in a sequential manner, a first segment is distributed to a first shader pipeline to be processed. After the shader pipeline input delay 113 has elapsed, a second segment is distributed to another shader pipeline to be processed. Thereafter, a third segment is distributed to another shader pipeline to be processed after the shader pipeline input delay 113 has elapsed. A similar process is repeated for the remaining available segments and remaining operable shader pipelines. As will be described below, this enables cache accesses by the shader pipelines to be spread out over a longer period of time. The peak number of simultaneous cache accesses by the shader pipelines is reduced, limiting cache memory coherence problems. Consequently, the average latency of cache accesses is also reduced. More importantly, there is a net increase in graphical processing performance through the graphical shader 110.

In an embodiment, the shader pipeline input delay 113 is a heuristic value. Experimentation with application programs and profiling of application programs may be used to determine the shader pipeline input delay 113 that is optimal for a given situation under which the graphical shader 110 will operate.

The shaded pixel data from the graphical shader 110 is inputted into the Raster Operations Processor 114 that performs additional processing on the shaded pixel data. The result from the Raster Operations Processor 114 is frame pixel data that are stored in a frame buffer memory 120 by a frame buffer interface 116. The frame pixel data may be used for various processes such as driving a display 122. Frame pixel data may be made available as required by way of the frame buffer interface 116.

FIG. 3 illustrates the graphical shader 110 of FIG. 2 in accordance with an embodiment of the present invention, showing multiple shader pipelines 302. The graphical shader 110 includes a shader distributor 304, a plurality of shader pipelines 302, a shader collector 308, a cache 310, and one or more shader instruction processors 320. It should be understood that the graphical shader 110 may have a different number of shader pipelines 302. The cache 310 is utilized by the shader pipelines 302.

Figure 4:
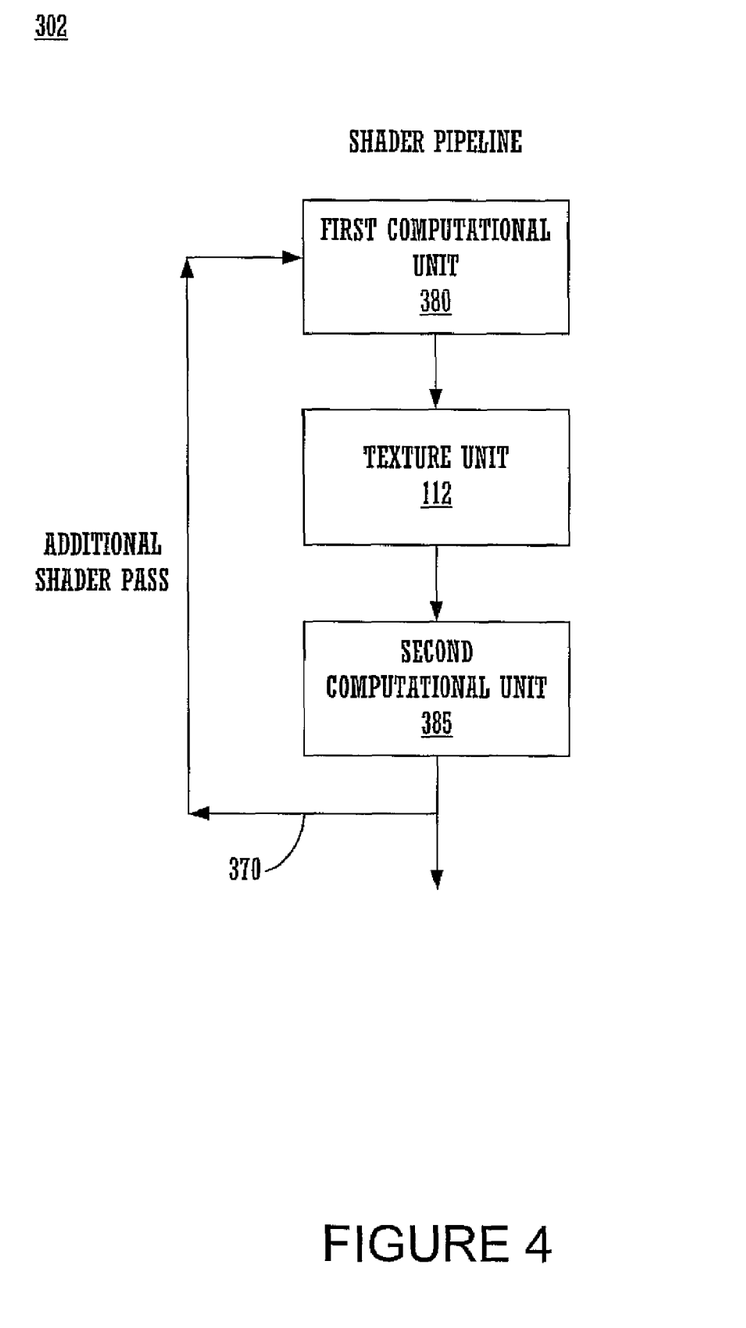
FIG. 4 illustrates a shader pipeline of FIG. 3 in accordance with an embodiment of the present invention.

Each shader pipeline 302 may be programmed independently to execute a distinct set of program instructions. One or more shader instruction processors 320 program the individual shader pipelines 302 as required to perform the required graphical processing tasks. FIG. 4 illustrates a shader pipeline 302 of FIG. 3 in accordance with an embodiment of the present invention. As depicted in FIG. 4, the shader pipeline 302 includes a first computational unit 380, a texture unit 112, and a second computational unit 385. A segment may loop through the shader pipeline 302 several times before the shader pipeline 302 completes processing the segment. Each loop through the shader pipeline is called a "shader pass" and executes one or more instructions of the shader program. The data path 370 facilitates multiple shader passes.

Referring again to FIG. 3, the shader distributor 304 distributes segments to the individual shader pipelines 302. As described above, the group of pixels (or quads) distributed to the shader pipeline is called a segment. In an embodiment, the shader distributor 304 load-balances the shader pipeline workloads between the available shader pipelines 302. Further, the shader distributor 304 is programmable. In particular, it includes the shader pipeline input delay 113, which can be programmed. In practice, the shader distributor 304 distributes a segment to one of the shader pipelines 302. Then, it distributes another segment to another one of the shader pipelines 302, after the shader pipeline input delay 113 has elapsed. Until a last segment is distributed to anyone of the shader pipelines 302, the shader distributor 304 continues to distribute another segment to another shader pipeline 302, after the shader pipeline input delay 113 has elapsed. Thus, the processing of the segments by the shader pipelines 302 is staggered.

The shader collector 308 collects and organizes the shaded output from the shader pipelines 302 so that the shaded output is in the proper order, resulting in shaded pixel data for the Raster Operations Processor 114 (FIG. 2).

Figure 5:
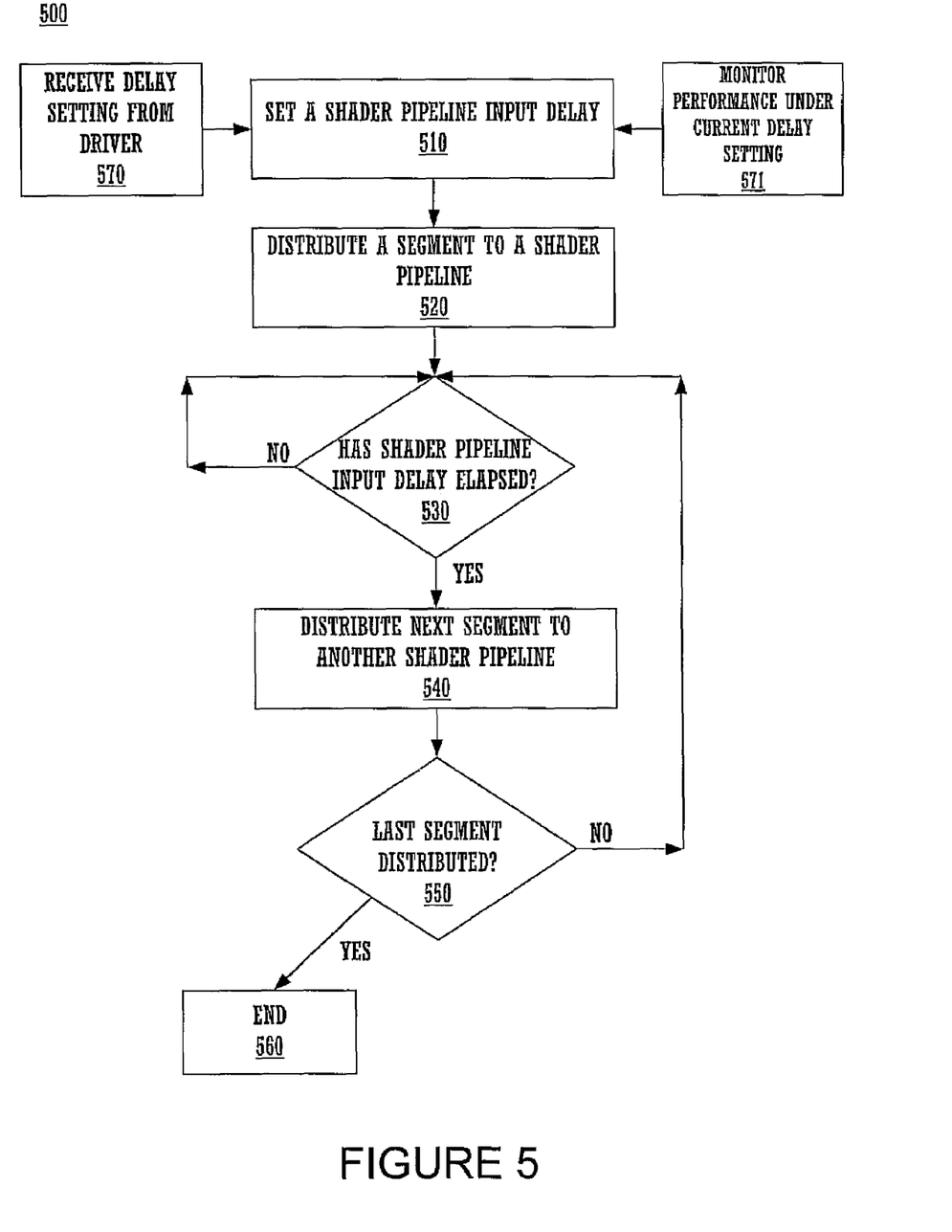
FIG. 5 illustrates a flow chart showing a method of distributing graphical data to shader pipelines in a graphical shader in accordance with an embodiment of the present invention.

FIG. 5 illustrates a flow chart showing a method 500 of distributing graphical data to shader pipelines in a graphical shader in accordance with an embodiment of the present invention. Reference is made to FIGS. 2-4 and 6.

At Block 510, a shader pipeline input delay 113 is set. In an embodiment, the shader pipeline input delay 113 is set by a graphics driver 130. The shader pipeline input delay 113 is received from the graphics driver 130 via the Front End 104 (FIG. 2), at Block 570. As described above, the shader pipeline input delay 113 may be a heuristic value. In general, the shader pipeline input delay 113 has a value that enables cache accesses by the shader pipelines 302 to be spread out over a longer period of time, reducing the peak number of simultaneous cache accesses by the shader pipelines 302, cache memory coherence problems, and the average latency of cache accesses. Further, the shader pipeline input delay 113 has a value that increases the graphical processing performance through the graphical shader 110. In an embodiment, the graphical shader 110 monitors performance under the current shader pipeline input delay and automatically adjusts the shader pipeline input delay 113 based on the monitored performance, at Block 571. For example, the graphical shader 110 may monitor the occurrence of cache thrashing and may adjust the shader pipeline input delay 113 accordingly.

Figure 6:
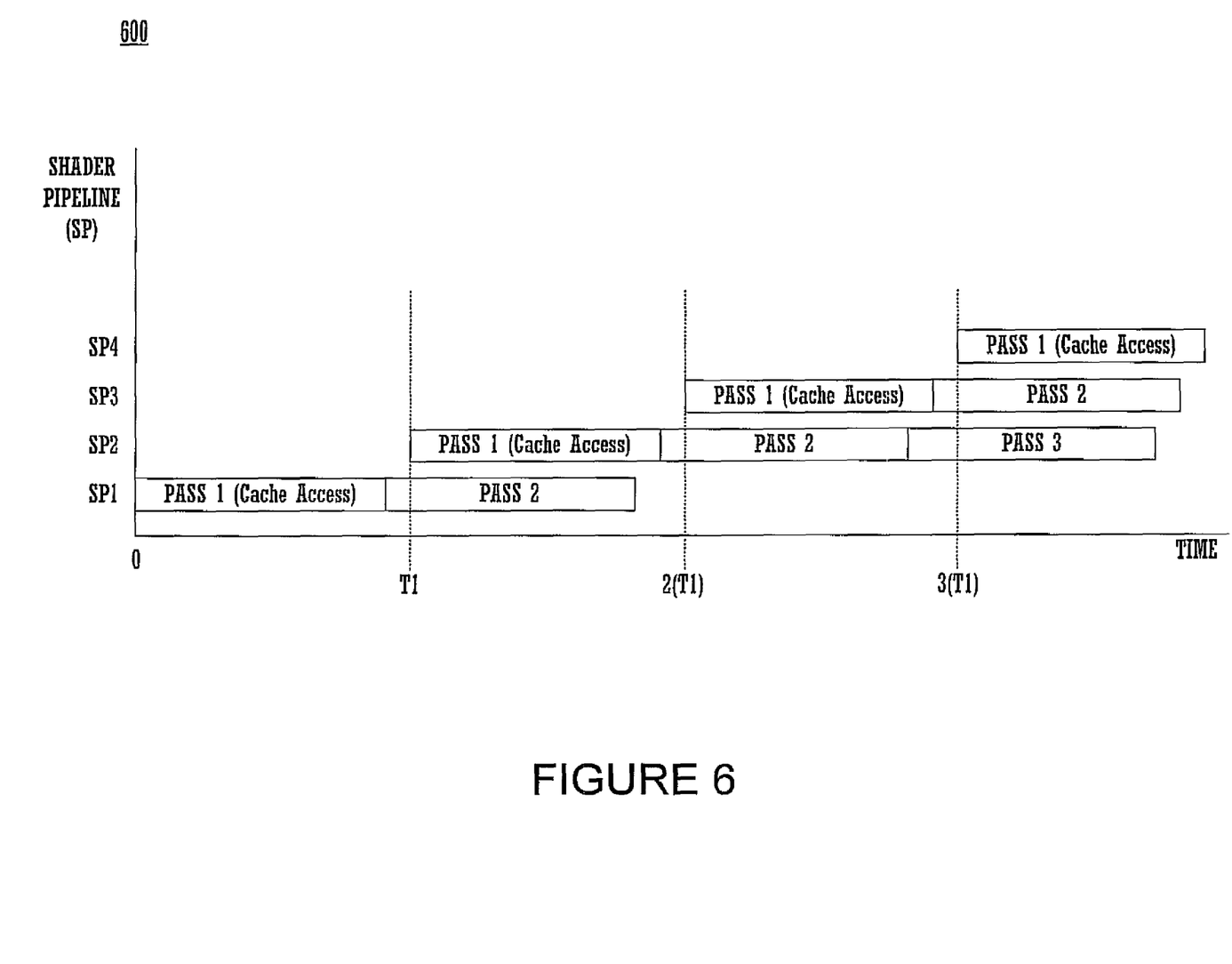
FIG. 6 illustrates a timing scheme for a graphical shader in accordance with an embodiment of the present invention.

Continuing, at Block 520, the shader distributor 304 distributes a segment to a shader pipeline 302 (e.g., shader pipeline 1 (SP1)) of the graphical shader 110 to be processed. FIG. 6 illustrates a timing scheme 600 for a graphical shader 110 in accordance with an embodiment of the present invention. In this case, it is assumed that only shader pass 1 contains access to the cache. It should be understood that the other shader passes (e.g., shader pass 2, shader pass 3, etc.) may also access the cache. As depicted in FIG. 6, at T=0, the shader distributor 304 distributes a segment to shader pipeline 1 (SP1). Thus, shader pipeline 1 (SP1) begins to perform the first shader pass (Pass 1) on its respective segment.

Returning to FIG. 5, at Block 530, the shader distributor 304 waits for the shader pipeline input delay 113 to elapse. It waits even if a segment is available for distribution to a shader pipeline 302.

At Block 540, after the shader pipeline input delay 113 has elapsed, the shader distributor 304 distributes a next segment to another shader pipeline 302 (e.g., shader pipeline 2 (SP2)) to be processed. If the next segment is not available, the shader distributor 304 waits for the next segment to be available. As shown in FIG. 6, at T=T1, the shader distributor 304 distributes the next segment to shader pipeline 2 (SP2). Thus, shader pipeline 2 (SP2) begins to perform the first shader pass (Pass 1) on its respective segment. Here, the shader pipeline input delay 113 has a value of T1. In one embodiment, the shader pipeline input delay 113 may represent a minimum or maximum delay between beginning of distribution of a segment to one shader pipeline (e.g., shader pipeline 1 (SP1)) and beginning of distribution of the next segment to another shader pipeline (e.g., shader pipeline 2 (SP2)). The maximum delay case corresponds to the situation where the next segment is ready to be distributed by the shader distributor 304 before lapse of the shader pipeline input delay 113. The minimum delay case corresponds to the situation where the next segment is not ready to be distributed by the shader distributor 304 before lapse of the shader pipeline input delay 113. In another embodiment, the shader pipeline input delay 113 may represent a minimum or maximum delay between end of distribution of a segment to one shader pipeline (e.g., shader pipeline 1 (SP1)) and beginning of distribution of the next segment to another shader pipeline (e.g., shader pipeline 2 (SP2)). The maximum delay case corresponds to the situation where the next segment is ready to be distributed by the shader distributor 304 before lapse of the shader pipeline input delay 113. The minimum delay case corresponds to the situation where the next segment is not ready to be distributed by the shader distributor 304 before lapse of the shader pipeline input delay 113.

Referencing FIG. 5, at Block 550, if the last segment is distributed to the shader pipelines 302, the method 500 proceeds to Block 560 to end. Otherwise, the method 500 repeats Blocks 530 and 540 in a similar manner. As shown in FIG. 6, at T=2(T1), the shader distributor 304 distributes the next segment to shader pipeline 3 (SP3). Thus, shader pipeline 3 (SP3) begins to perform the first shader pass (Pass 1) on its respective segment. Further, at T=3(T1), the shader distributor 304 distributes the next segment to shader pipeline 4 (SP4). Thus, shader pipeline 4 (SP4) begins to perform the first shader pass (Pass 1) on its respective segment.

FIG. 6 shows that the first shader pass processing of the segments by the shader pipelines 302 (e.g., SP1, SP2, SP3, and SP4) is staggered. Similarly, the second, third, and subsequent shader passes of the segments through the shader pipelines 302 (e.g., SP1, SP2, SP3, and SP4) will also be staggered. During the first shader pass (e.g., Pass 1), the shader pipelines 302 (e.g., SP1, SP2, SP3, and SP4) typically access the cache 310 of the graphical shader 110. Here, the first shader passes (e.g., Pass 1) have been spread out over a longer period to improve cache efficiency and to better utilize available cache memory bandwidth.

At a glance, delay should result in overall shader program execution slowdown. In practice, most shader programs do not access the cache at every pass. Therefore delaying segment launch yield a much smoother cache access pattern and thus effectively increases cache efficiency. The overall effect is positive even though additional delays are injected.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of distributing graphical data to a plurality of shader pipelines in a graphical shader, said method comprising:

setting a shader pipeline input delay;

distributing a group of said graphical data to a first shader pipeline of said plurality of shader pipelines in said graphical shader to be processed;

waiting for said shader pipeline input delay to elapse; and after said shader pipeline input delay has elapsed, distributing another group of said graphical data to a second shader pipeline of said plurality of shader pipelines in said graphical shader to be processed, wherein said shader pipeline input delay delays the distribution of said graphical data to said plurality of shader pipelines.

2. The method as recited in claim 1 further comprising:
until a last group of said graphical data is distributed, repeating said waiting for said shader pipeline input delay to elapse and said distributing another group of said graphical data to another shader pipeline of said graphical shader after said shader pipeline input delay has elapsed.

3. The method as recited in claim 1 wherein said shader pipeline input delay represents a minimum or maximum delay between end of distribution of said group to said shader pipeline and beginning of distribution of another group to another shader pipeline.

4. The method as recited in claim 1 wherein said shader pipeline input delay represents a minimum or maximum delay between beginning of distribution of said group to said shader pipeline and beginning of distribution of another group to another shader pipeline.

5. The method as recited in claim 1 wherein each group of graphical data is a segment of graphical data.

6. The method as recited in claim 1 wherein said setting said shader pipeline input delay is performed by a graphics driver.

7. The method as recited in claim 1 wherein said setting said shader pipeline input delay comprises:
monitoring performance under said shader pipeline input delay; and
automatically adjusting said shader pipeline input delay, wherein said monitoring and said automatically adjusting are performed by said graphical shader.

8. A graphical shader comprising:
a plurality of shader pipelines for processing graphical data; and
a shader distributor for distributing a group of said graphical data to one of said plurality of shader pipelines and for distributing another group of said graphical data to another one of said shader pipelines after a shader pipeline input delay has elapsed, wherein said shader pipeline input delay delays the distribution of said graphical data to said plurality of shader pipelines and wherein said shader pipeline input delay is set prior to distribution of graphical data to said plurality of shader pipelines.

9. The graphical shader as recited in claim 8 wherein until a last group of said graphical data is distributed to anyone of said shader pipelines, said shader distributor distributes another group of said graphical data to another shader pipeline of said graphical shader after said shader pipeline input delay has elapsed.

10. The graphical shader as recited in claim 8 wherein said shader pipeline input delay represents a minimum or maximum delay between end of distribution of said group to said shader pipeline and beginning of distribution of another group to another shader pipeline.

11. The graphical shader as recited in claim 8 wherein said shader pipeline input delay represents a minimum or maximum delay between beginning of distribution of said group to said shader pipeline and beginning of distribution of another group to another shader pipeline.

12. The graphical shader as recited in claim 8 wherein each group of graphical data is a segment of graphical data.

13. The graphical shader as recited in claim 8 wherein said shader pipeline input delay is programmable.

14. The graphical shader as recited in claim 13 wherein said shader pipeline input delay is programmed by a graphics driver.

15. The graphical shader as recited in claim 13 wherein said shader pipeline input delay is automatically adjusted by said graphics shader.

16. The graphical shader as recited in claim 8 wherein each shader pipeline comprises a first computational unit, a texture unit, and a second computational unit.

17. A semiconductor device comprising:
a graphics processing pipeline comprising a graphical shader, wherein said graphical shader includes:
a plurality of shader pipelines for processing graphical data; and
a shader distributor for distributing a group of said graphical data to one of said plurality of shader pipelines and for distributing another group of said graphical data to another one of said plurality of shader pipelines after a shader pipeline input delay has elapsed, wherein said shader pipeline input delay delays the distribution of said graphical data to said plurality of shader pipelines and wherein said shader pipeline delay is set prior to distribution of graphical data to said plurality of shader pipelines.

18. The semiconductor device as recited in claim 17 wherein until a last group of said graphical data is distributed to anyone of said shader pipelines, said shader distributor distributes another group of said graphical data to another shader pipeline of said graphical shader after said shader pipeline input delay has elapsed.

19. The semiconductor device as recited in claim 17 wherein said shader pipeline input delay represents a minimum or maximum delay between end of distribution of said group to said shader pipeline and beginning of distribution of another group to another shader pipeline.

20. The semiconductor device as recited in claim 17 wherein said shader pipeline input delay represents a minimum or maximum delay between beginning of distribution of said group to said shader pipeline and beginning of distribution of another group to another shader pipeline.

21. The semiconductor device as recited in claim 17 wherein each group of graphical data is a segment of graphical data.

22. The semiconductor device as recited in claim 17 wherein said shader pipeline input delay is programmable.

23. The semiconductor device as recited in claim 22 wherein said shader pipeline input delay is programmed by a graphics driver.

24. The semiconductor device as recited in claim 22 wherein said shader pipeline input delay is automatically adjusted by said graphics shader.

25. The semiconductor device as recited in claim 17 wherein said semiconductor device comprises a graphics processing unit (GPU).

26. The semiconductor device as recited in claim 17 wherein said graphical shader monitors cache thrashing and adjusts the shader pipeline input delay accordingly.

* * * * *